United States Patent [19]

Kraus

[11] Patent Number: 4,501,172
[45] Date of Patent: Feb. 26, 1985

[54] HYDRAULIC SPEED CONTROL ARRANGEMENT FOR AN INFINITELY VARIABLE TRANSMISSION

[75] Inventor: Charles E. Kraus, Austin, Tex.
[73] Assignee: Excelermatic Inc., Austin, Tex.
[21] Appl. No.: 408,422
[22] Filed: Aug. 16, 1982
[51] Int. Cl.³ .................. B60K 41/16; F16H 15/00
[52] U.S. Cl. ................................. 74/867; 74/190.5
[58] Field of Search ................ 74/867, 868, 752 C, 74/687, 731, 190.5, 793, 872; 137/47, 58, 486, 117, 116.3

[56] References Cited

U.S. PATENT DOCUMENTS

| Re. 24,892 | 10/1960 | Banker | 137/117 |
| 2,485,126 | 10/1949 | Wood | 74/752 C |
| 4,086,820 | 5/1978 | Kraus | 74/200 |
| 4,369,675 | 1/1983 | van Deursen | 74/868 |

*Primary Examiner*—Leslie A. Braun
*Assistant Examiner*—David Novais
*Attorney, Agent, or Firm*—Klaus J. Bach

[57] ABSTRACT

A constant output speed control arrangement for an infinitely variable transmission whose ratio of transmission is controllable by a hydraulic control fluid wherein the transmission output shaft has a fluid displacement pump associated therewith and connected to a control valve structure including a piston disposed in a cylinder and being movable by the control fluid from the pump against the force of a spring with a control passage extending through the piston and a control opening in the cylinder providing communication with a hydraulic ratio control structure in the transmission, the control opening being so arranged relative to the piston that the control opening is closed by the piston when the piston is moved against the spring force by an excess amount of control fluid supplied by the pump so as to cause a transmission ratio change for a decrease of the transmission output shaft, and the control opening is opened by the piston when the piston is returned by the spring for admitting an increased amount of control fluid to the transmission thereby causing an increase in the transmission output shaft speed.

5 Claims, 2 Drawing Figures

HYDRAULIC SPEED CONTROL ARRANGEMENT FOR AN INFINITELY VARIABLE TRANSMISSION

BACKGROUND OF THE INVENTION

The present invention relates to a speed control arrangement for automatically controlling the output shaft speed of an infinitely variable transmission, particularly for maintaining the output shaft speed at a constant value independently of the input shaft speed.

In many cases it would be desirable to operate certain equipment at a constant speed while the speed of the power supply varies. Car engine accessories, in many cases, are needed to a greater degree when the car is moving slowly or at a standstill, that is, when the engine is idling, than at high vehicle and engine speeds. Power steering, for example, is hardly needed when a car is moving at high speeds on a straight highway but is utilized to its fullest during parking maneuvers. Demands on the air conditioning are much greater when a car is at a standstill or moving slowly, and the radiator fan is needed only during slow-speed operation of the vehicle since at travel speeds ram air alone is sufficient for radiator cooling. Also the alternator must be able to supply all the electric power required for the operation of the vehicle at engine idling speed.

All the accessories accordingly need to be oversized so as to be adequate at engine idle speeds. They are therefore generally relatively heavy and wasteful at higher speeds. They could be designed to substantially smaller sizes if they could only be operated at a predetermined design speed independently of the speed of their power supply. It may also be mentioned that a smaller engine would be sufficient to drive a particular vehicle. Smaller size equipment would not only be lighter and less expensive but it would also save a considerable amount of fuel. Government studies indicate that 3 to 5% fuel could be saved in the operation of a vehicle if only the main engine accessories would be operated at a constant predetermined speed.

Infinitely variable speed transmissions which could be used in connection with variable speed power supplies to provide a constant output speed for driving accessories are available but transmission controls are complicated, relatively unreliable and expensive.

It would therefore be desirable to provide an inexpensive, simple and reliable speed control arrangement for an infinitely variable transmission which would permit operation of engine accessories at a constant predetermined speed while deriving power from an engine operated at varying speeds.

SUMMARY OF THE INVENTION

In a constant output speed control arrangement for a hydraulically operated infinitely variable transmission the transmission has a fluid displacement pump associated with its output shaft to provide a fluid supply depending on the speed of the output shaft, the fluid being supplied to a control valve structure including, in a cylinder, a piston movable by the control fluid against the force of a spring. A control flow path including a restriction is arranged parallel to the piston such that the fluid pressure forcing the piston against the spring increases when the fluid supply increases. A control fluid opening which is arranged adjacent the piston for supplying ratio control fluid to the transmission is closed by the piston when the piston is moved against the spring by an excess fluid supply thereby decreasing the amount of control fluid supplied to the transmission and changing the transmission ratio for a reduced output shaft speed. Upon decrease of the amount of fluid supplied by the pump, the piston is moved by the spring to open the control opening providing for an increase in the fluid supplied to the transmission thereby causing a change of the transmission ratio for an increase in the transmission output shaft speed.

DESCRIPTION OF THE PREFERRED EMBODIMENTS

Some types of infinitely variable transmissions are controlled by hydraulic means and it is this type of transmission to which the present invention is applicable. For this type of transmission, hydraulic fluid pressure is supplied by a pump which is driven by the power supply, that is, the engine, the output of such pump varying with the engine speed.

Figure 1:
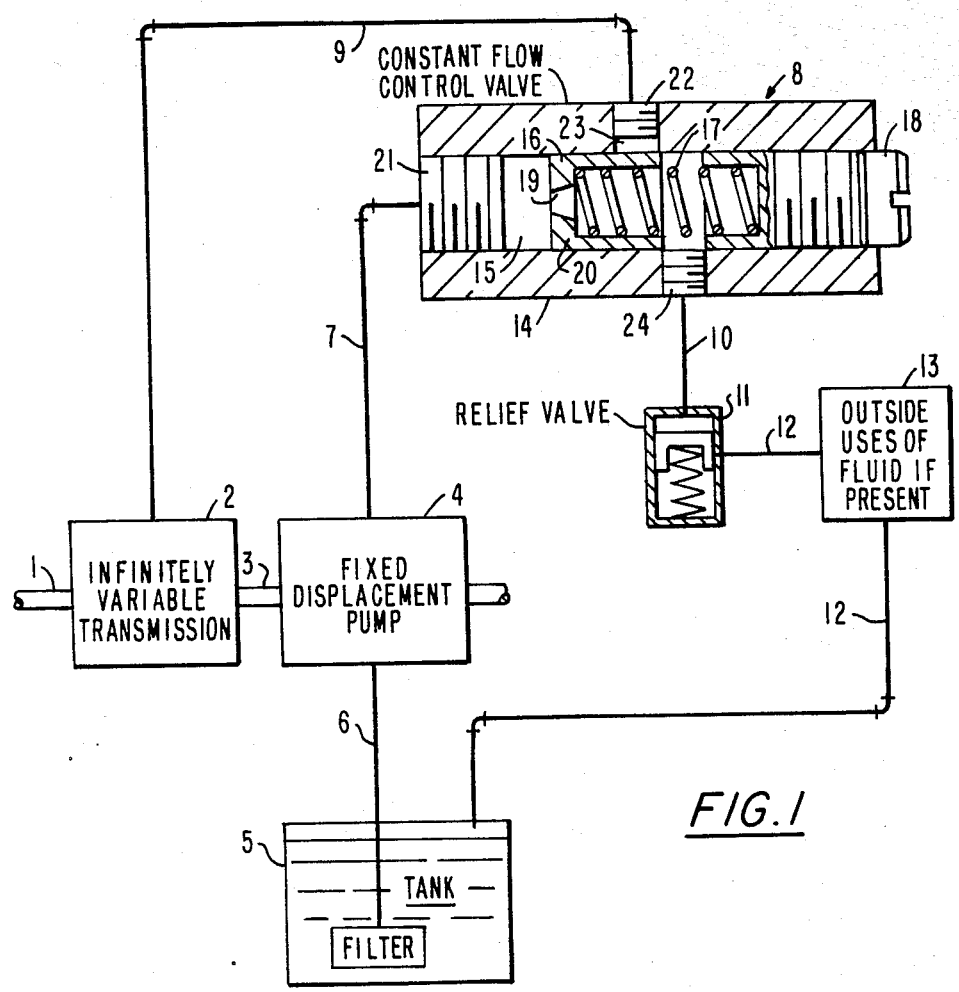
FIG. 1 shows in cross section a control valve and schematically the control arrangement in which the valve is disposed for controlling the output shaft speed of an infinitely variable transmission.

In the schematic arrangement as shown in FIG. 1 power is supplied to the input shaft 1 of an infinitely variable transmission 2 from a power source of varying speed such as an automobile engine. The transmission 2 may be a traction roller transmission of the type as described in the present inventor's U.S. Pat. No. 4,086,820 wherein the transmission ratio control is achieved by hydraulic control means, that is, the ratio is changed to provide slower output shaft speed by supplying control fluid to the hydraulic transmission ratio control of the transmission.

The output shaft 3 of the transmission 2 is connected to a load (not shown) which requires constant operating speed and has operatively associated therewith a displacement pump 4 which provides for a fluid flow from a fluid tank 5 through a suction line 6 and a discharge line 7 to a transmission control valve 8. The control valve 8 is connected to the transmission 2 by way of a control fluid line 9 through which pressurized fluid is supplied to the ratio control cylinders of the transmission for adjusting the transmission ratio. Discharge line 10 has a pressure relief valve 11 associated therewith so as to provide for a predetermined minimum hydraulic pressure within the hydraulic transmission ratio control system, as needed for the ratio control of the transmission. Discharge fluid from the pressure relief valve 11 is returned to the tank 5 through a return conduit 12. The discharge fluid may be used for other purposes such as lubrication of accessories or operation of hydraulic motors as indicated by box 13 arranged in the return conduit 12.

The transmission ratio control valve 8 consists of a body 14 having a cylindrical cavity 15 with a piston 16 movably disposed therein. The piston 16 is biased by a control spring 17 whose force is adjustable by a control screw 18 threaded into the body 14. The piston 16 has a flow control orifice 19 which is preferably tapered outwardly in the direction of fluid flow therethrough and which extends through the face 20 of the piston 16 adjacent an inlet port 21 which is in communication with the discharge line 7 of the displacement pump 4 so that increased fluid flow from the displacement pump 4 causes a pressure build-up in cylinder 15 which moves the piston 16 against the force of the spring 17. A control fluid port 22 having the control fluid line 9 connected thereto is formed in the housing 14 with a control opening 23 adapted to be closed by the piston 16 when the piston 16 is moved against the spring 17 beyond a predetermined point, that is, when the fluid pressure is cylinder 15 increases above a predetermined value. A fluid discharge port 24 is associated with the discharge line 10 which includes the relief valve 11 for supplying the fluid not used for speed control purposes to outside users or returning it to the tank 5.

OPERATION OF THE ARRANGEMENT

Power is supplied to the infinitely variable transmission 2 from a variable speed power source through input shaft 1. The transmission is of the type as disclosed in U.S. Pat. No. 4,086,820 which is hydraulically operable to change the transmission ratio. The ratio is changed for lower output speed if the hydraulic fluid supply increases and to higher output speed if the hydraulic fluid supply decreases. A displacement pump 4 associated with the transmission output shaft 3 supplies a control fluid flow through discharge line 7 to the transmission control valve 8, which flow is proportional to the speed of the transmission output shaft 3. The size of the flow control orifice 19 in the piston 16, the diameter of the piston 16 and the spring 17 are so selected that at a predetermined flow, that is, at a predetermined desired transmission output speed, the piston is moved against the spring 17 to just about close the control opening 23. If the transmission output speed increases above the desired value, the piston 16 is moved further against the spring 17 thereby fully closing the control opening 23 and shutting off the control fluid supply to the transmission, which results in a change of the transmission ratio for lower transmission output speed. If the transmission output speed falls below the desired value, the control fluid flow to cylinder 15 is reduced, piston 16 is moved by the spring 17 to open control opening 23 so as to increase the control fluid supply to the transmission, thereby changing the transmission ratio for greater transmission output shaft speed. The desired transmission output shaft speed is adjustable by adjustment of the control screw 18.

The flow of fluid through the orifice 19 is normally substantially larger than the control fluid flow required for changing the transmission ratio. However, a certain fluid pressure is required to operate the transmission ratio control structure and this minimum pressure is maintained by the relief valve 11 which permits excess control fluid to discharge through return port 24 into the return conduit 12.

With the arrangement according to the present invention, a simple valve structure is provided which is able to control the speed of an infinitely variable speed transmission in such a manner that the output shaft speed remains essentially constant independent of the input shaft speed of the transmission.

The valve structure however is not limited to the particular embodiment as given in FIG. 1.

Figure 2:
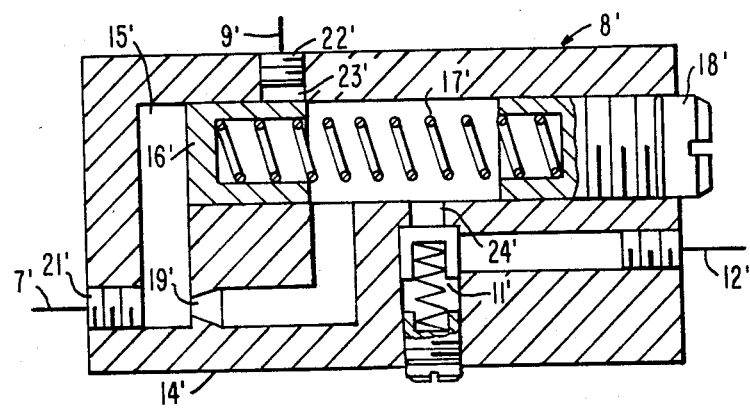
FIG. 2 shows a valve functionally identical with the valve shown in FIG. 1.

As shown in FIG. 2 the relief valve may be incorporated into the control valve and the flow control orifice may not be disposed in the piston. Functionally identical elements are indicated in FIG. 2 with the same numeral as in FIG. 1 provided however with an apostrophe.

It is also noted that the transmission does not need to be an infinitely variable traction roller transmission as shown in the cited U.S. Pat. No. 4,086,820. A piston operated by the control fluid could be used to control the transmission ratio of any type of infinitely variable transmission. It could, for example, be used to operate the position control lever of a variable V-belt sheave transmission.

If an infinitely variable transmission with a control arrangement as disclosed herein is, for example, connected to an automobile engine and used to drive the engine accessories such as the fan, power steering pump, alternator and air conditioning compressor, all these accessories may be relatively small and light since they do not have to be designed to provide full performance at very low, that is, engine idle, speed. They will be operated at a constant design speed independently of the engine speed.

I claim:

1. A constant output speed control arrangement for an infinitely variable transmission whose transmission ratio is controllable by controlling the supply of hydraulic control fluid thereto, and which is adapted to be connected to a variable speed power source, said control arrangement comprising a displacement pump associated with the output shaft of said transmission so as to supply a control fluid flow proportional to the speed of the transmission output shaft, a transmission control valve structure including a cylinder having a piston movably disposed therein, said piston being biased in one direction by a spring arranged at one side thereof, means for supplying said control fluid from said displacement pump to said cylinder at the other side of said piston, a passage means providing communication between said one and said other side of said piston and having a flow control orifice disposed therein for permitting passage of a desired amount of control fluid, said cylinder having a control opening arranged at said one side of said portion and in communication with said transmission for controlling its transmission ratio, said control opening being adapted to be closed by the piston when said piston is moved by a larger than desired amount of control fluid against the force of said spring for changing the transmission ratio so as to reduce transmission output shaft speed and said control opening, when being opened by said piston upon supply of less than said desired amount of control fluid, providing for the supply of control fluid to said transmission for a change of the transmission ratio so as to increase transmission output shaft speed, and a relief valve structure associated with said valve for maintaining within said valve a predetermined fluid pressure sufficient to operate the speed change control mechanism of said infinitely variable transmission.

2. An arrangement as claimed in claim 1, wherein said cylinder is a passage extending through the valve housing and having said control fluid supply means connected to one end thereof and a control screw threaded into the opposite end thereof with said piston being disposed therebetween and a control spring disposed between said piston and said control screw.

3. An arrangement as claimed in claim 2, wherein said means providing communication between said one and said other side of the piston is a passage extending through said piston and including a control orifice.

4. An arrangement as claimed in claim 3, wherein said control orifice is an opening formed in the face of said piston and tapered outwardly in the direction of fluid flow therethrough.

5. An arrangement as claimed in claim 1, wherein a fluid discharge port is formed in the housing in communication with the cylinder space between said piston and said control screw, said outlet port having said relief valve associated therewith.

* * * * *